United States Patent Office 2,769,525
Patented Nov. 6, 1956

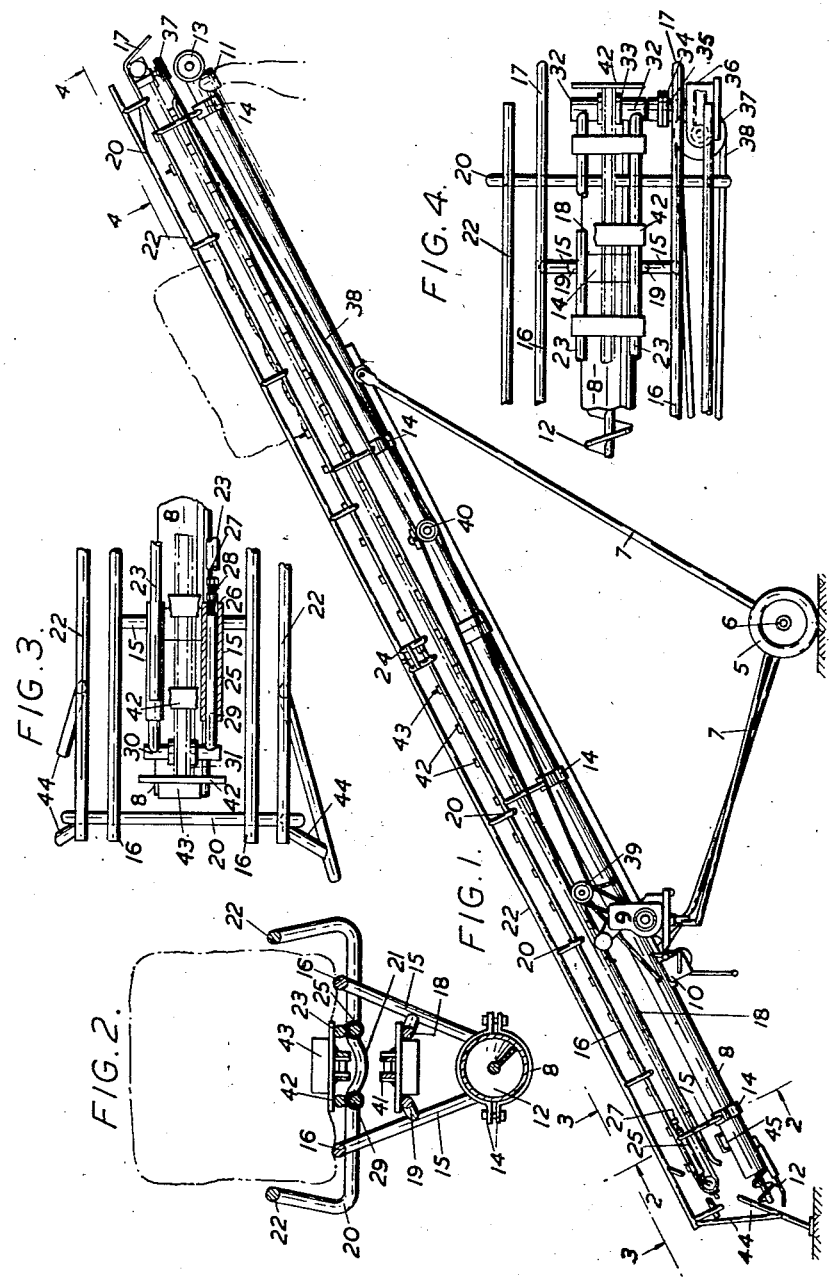

2,769,525

CONVEYORS OR ELEVATORS FOR BULK MATERIAL

William Herscovitch, Melbourne, Victoria, Australia

Application August 4, 1953, Serial No. 372,280

4 Claims. (Cl. 198—75)

This invention relates to conveyors or elevators for bulk material and more particularly to apparatus for use in elevating and otherwise handling grain (such as wheat) and also bales as of hay, bagged materials and the like.

The main object of the invention is to provide apparatus which may be used for elevating and/or conveying bales, bags, crates and the like and also for elevating and/or conveying loose material such as grain. A further object is to devise elevating apparatus usable for the handling of both loose grain materials and also bagged or packaged materials—as bales, bags and so on. Another object is to provide apparatus, for the purposes stated, which will be of relatively sturdy construction, relatively economical to manufacture and extremely efficient in operation.

The invention devised with these and other objects in view resides in elevating and/or conveying apparatus having, in combination, a screw type of conveyor and an endless chain or belt type of conveyor. A feature of the invention resides in the provision of a frame, for the endless conveyor, of which a main supporting member consists of a longitudinally arranged tube which also constitutes the housing for a rotatable screw. There is provided a motor and drives to the endless conveyor and to the screw. In another aspect, the invention resides in the provision of an attachment for a screw type conveyor, the attachment incorporating an endless belt or chain so that when the attachment is mounted on the screw type conveyor the composite apparatus may be used as an endless conveyor.

Other features of the invention will be made apparent from the following description of a preferred construction of apparatus made according to the invention. This construction is described with reference to the accompanying drawings, wherein:

Figure 1 shows the composite apparatus in side elevation;

Figure 2 is a cross-section on the line 2—2 of Figure 1;

Figure 3 is a plan view taken on the line 3—3 of Figure 1, illustrating one end portion of the apparatus, and Figure 4 is a plan view taken on line 4—4 of Figure 1, illustrating the opposite end portion of the apparatus.

The apparatus shown in the drawings has transport wheels 5 mounted on a transverse axle 6 and a supporting frame 7 fastened to the axle 6. Secured to the frame 7 are a longitudinally arranged tubular housing 8, an engine 9 and control devices 10. The housing 8 is made in two lengths connected together at about the middle of the housing, and it has a discharge opening 11 near one end as is customary. A screw conveyor 12 is rotatably mounted within the housing 8, drive means 13 being provided at the delivery end of the housing in somewhat conventional manner so that the screw 12 may be driven by a chain drive from the engine 9.

Clamped about the housing 8 are brackets 14, each having a pair of V-shaped leg members 15 secured thereto, see particularly Figure 2. Two upper parallel rails 16 are fastened to the upper ends of the log members 15 so as to extend longitudinally of the apparatus and substantially parallel to the housing 8, except at the discharge end of the apparatus where said rails are bent downwardly as shown at 17. Between the rails 16 and the housing 8 two lower runners 18 are fastened in spaced parallel arrangement to the leg members 15 by means of short arms 19. These lower runners support the lower or return run of an endless conveyor.

Spaced along the apparatus are substantially U-shaped transverse brackets 20 which are fastened by their bights to the upper rails 16, the bight of each bracket having a downwardly curved central portion 21 and each bracket having upwardly extending side arms to which are fastened longitudinal guide rails 22. Upper parallel runners 23 which support the upper run of the endless conveyor are secured to the brackets 20 on opposite sides of the downwardly curved portions 21, the upper runners 23 and the upper rails 16 being in substantially the same plane as seen in Figure 2. The upper rails 16, lower runners 18, upper runners 23 and guide rails 22 are made in two substantially equal lengths so that the joins occur at the same point as the join in the housing 8, see Figure 1. This is done for convenience of production and to facilitate transport of the machine. The brackets 20 are so disposed that there is a bracket on each side of the division near the adjacent end of the upper rails 16. A connecting strap 24 is secured to these two brackets 20 on each side of the apparatus so as to fasten together the two parts of the overhead frame constituted by the legs 15, upper rails 16, lower runners 18, arms 19, brackets 20, guide rails 22, and upper runners 23.

Mounted beneath the upper runners 23, at the feeding end thereof, are two tubes 25, see Figure 3 in particular. Each of these tubes 25 has a nut 26 at its inner end, an adjusting screw 27 engaged in the nut 26, a lock nut 28 on the screw 27 and a bar 29 slidably mounted in the tube so that the inner end of the screw 27 will engage the bar 29 and function as a stop to limit axial movement of the bar 29 towards the discharge end of the machine. The outer ends of the two bars 29 are fastened to a transverse axle 30 on which a chain sprocket wheel 31 is freely mounted.

At the discharge end of the machine (see Figure 4) two bearings 32 are fastened to the upper runners 23 and journaled in these bearings in a transversely disposed driven shaft on which is mounted a driving sprocket 33, the sprocket 33 being located between said bearings 32 so as to be substantially equidistant from the upper runners 23. To one end of said driven shaft is fitted a dog-clutch member 34 which is engaged by a complementary dog-clutch member 35 on the output shaft of a gear box 36. On the injut shaft of the gear box 36 is fitted a chain sprocket wheel 37 which is driven by the chain 38 from the engine 9. Incorporated in the drive from the engine 9 are an intermediate sprocket 39 and an idler sprocket 40. The drive is so arranged that the chain 38 may be engaged either with the chain sprocket wheel 37 or with the drive means 13 for driving the screw 12.

An endless chain 41 extends around the two chain sprocket wheels 31 and 33, and fastened to said chain are a number of evenly spaced plates 42. Several of the plates 42, at equal intervals about the chain 41, have pushers 43 fastened to them in conventional manner. In the travel of the endless chain 41 the plates 42 ride on the upper runners 23 as they move from the feeding end of the machine to the discharge end and, after passing about the sprocket wheel 33, the plates 42 ride on the lower runners 18, see Figure 2.

At the feeding end of the machine supports 44 are fastened to the guide rails 22 so that such end of the conveyor chain 41 may be arranged as a desired height.

A handle 45 is secured to the tubular housing 8, near the feeding end, for convenience in handling and manual movement of the machine.

As the tubular housing 8 of the screw conveyor also constitutes a main support of the frame of the endless chain conveyor the members of the overhead frame may be made relatively light in section. Consequently, the overall weight of the composite, dual purpose machine will be relatively low. By altering the drives—from the chain sprocket wheel 37 to the drive means 13 or vice versa—the apparatus may be used either as a screw conveyor or an endless-chain conveyor. In normal usage on a farm it is not required to operate a screw conveyor for the bulk handling of grain at the same time as it is required to use an endless-chain conveyor for the handling of baled hay. Consequently, the apparatus provided by this invention may be used for its dual purposes without the usage for one purpose interfering with the usage for the other purpose. As the period of usage of a screw conveyor on a farm is relatively short the apparatus will in general be used as an endless-chain conveyor, and then converted for use as a screw conveyor when grain or granular material is to be handled in bulk.

It will be apparent that the overhead frame and the endless conveyor carried thereby may be detached from the tubular housing 8, when the screw conveyor may be used without having the endless conveyor fastened to it.

I claim:

1. In combination with an auger conveyor, an endless conveyor attachment comprising a frame having upper and lower runners and a plurality of V-shaped leg members symmetrically mounting said runners in the region of the wider ends of said leg members, an endless conveyor means having upper and lower runs supported on said upper and lower runners respectively, and means at the apices of said leg members for detachably securing the frame to the tube of the auger conveyor to extend parallel with said tube.

2. An attachment as claimed in claim 1, wherein said means at the apices of said leg members comprise diametrally split rings adapted to be assembled about the tube to clamp the tube.

3. A portable combined endless and auger conveyor comprising a single straight tube providing a main structural member of the conveyor, an auger rotatably mounted in said tube, a power source carried by the tube, transport wheels carried by the tube, a light frame substantially the same length as and running adjacent and parallel to the tube and comprising a series of legs disposed at intervals along its length and secured to the tube whereby the frame is supported along its length on said tube, an endless conveyor means supported and guided on said frame, and means for selectively connecting the power source to the auger and to the endless conveyor means.

4. A portable endless conveyor comprising a single straight tube providing a main structural member of the conveyor, a light frame substantially the same length as and running adjacent and parallel to the tube and comprising a series of legs disposed at intervals along its length and secured to the tube whereby the frame is supported along its length on said tube, an endless conveyor means supported and guided on said frame, a power source carried by the tube for operative connection to said endless conveyor, and transport wheels carried by said tube, each said leg being generally V-shaped and rigid with a clamping ring at the apex of the V, which ring tightly embraces the tube to secure detachably the leg thereto, said endless conveyor means comprising an endless chain and transverse load-supporting elements secured to said chain at intervals, and said frame comprising a pair of upper runners and a pair of vertically aligned lower runners, the runners of each pair being disposed symmetrically of and secured to said V-shaped legs one on either side of the chain, and the transverse elements of the upper and lower runs of the chain slidingly engaged and being supported by said upper and said lower runners respectively.

References Cited in the file of this patent
UNITED STATES PATENTS

| | | |
|---|---|---|
| 1,555,887 | Sperry | Oct. 6, 1925 |
| 1,884,399 | Vail | Oct. 25, 1932 |
| 1,990,810 | Young | Feb. 12, 1935 |
| 2,528,917 | Slocum | Nov. 7, 1950 |
| 2,533,261 | Howe | Dec. 12, 1950 |
| 2,675,116 | Collins | Apr. 13, 1954 |